J. B. SLAWSON.

CHANGE-GATES FOR CARS.

No. 7,780. Reissued July 3, 1877.

Attest:
A. McCallum
D. G. Stuart

Inventor:
John B. Slawson
by L. Homer Atty.

N. PETERS, PHOTO-LITHOGRAPHER, WASHINGTON, D. C.

UNITED STATES PATENT OFFICE.

JOHN B. SLAWSON, OF NEW YORK, N. Y.

IMPROVEMENT IN CHANGE-GATES FOR CARS.

Specification forming part of Letters Patent No. 73,396, dated January 14, 1868; Reissue No. 7,780, dated July 3, 1877; application filed April 30, 1877.

*To all whom it may concern:*

Be it known that I, JOHN B. SLAWSON, of New York, in the county of New York and State of New York, have invented a Change-Gate for Public Conveyances; and I do hereby declare that the following is a full, clear, and exact description thereof, that will enable others skilled in the art to which it appertains to make and use the same, reference being had to the accompanying drawing, and to the letters of reference marked thereon, which form a part of this specification, in which—

Figure 1:
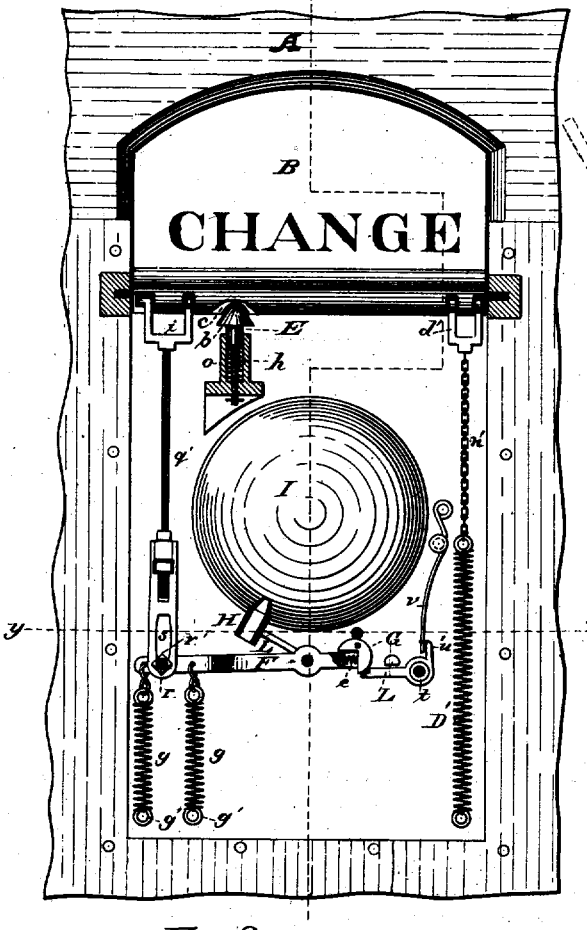
Figure 2:
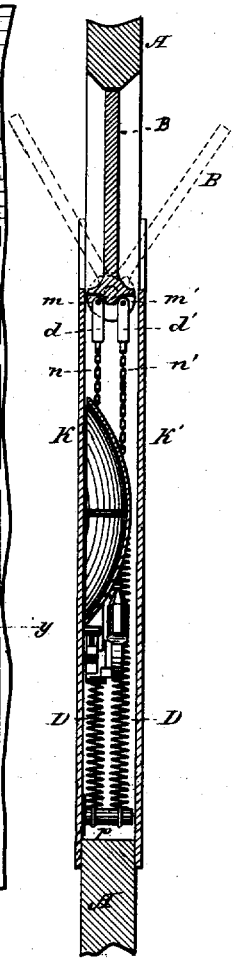

Figure 1 represents a front elevation of my gate as applied to a door of a street-car, its front wall or plate being removed, and that portion of the door to which it is applied being shown as broken off and partly in section. Fig. 2 is a vertical transverse section taken on the line *x x* of Fig. 1, with the bell-hammer shown in elevation; and Fig. 3, a horizontal section of the same as taken through the line *y y*, with the bell-hammer broken off.

My invention relates to the construction and adaptation of a device to the doors or walls of street-cars, stages, omnibuses, and other public conveyances, by the use of which passengers may pay their fare or obtain change from the party authorized to receive or make it without the necessity of either party opening the ordinary door of the conveyance for that purpose.

The invention consists in suitably arranging and combining, with a car or other public conveyance, a small gate capable of being opened either from the out or inside of the conveyance, for the purpose of enabling the authorized agent of the owner of the conveyance to receive the fare or make change for the passengers, or the latter to make payment of their fare or receive their change without either of them, for these purposes, having to open the entrance or exit door of the conveyance.

It also consists in combining, with a car or other public conveyance, a small gate and bell, the gate being capable of being opened either from the inside or outside of the conveyance, and the bell so combined therewith that each time the gate is opened, whether from the inside or outside of the car, an alarm will be sounded for the purpose, in the first place, of notifying the driver or conductor that a passenger desires to make payment of his fare or to obtain change, and, in the second place, to notify the passenger to pay his fare or to receive his change.

It also consists in combining, with the gate, certain devices by means of which, on being opened and the pressure of the hand removed, it will automatically close the opening, and thus prevent the influx of cold air to the interior of the conveyance to the annoyance or discomfort of the passengers.

It also consists in forming the frame of the gate in two parts or halves, to facilitate the application of the gate to the door or wall of the conveyance, and to inclose the bell and its operating parts.

To enable those skilled in the art to make, construct, and use my invention, I will describe it in detail.

In the drawing, the gate B is represented as being applied to a door, A, of one of the end walls of the conveyance, only a portion of the door being represented, the remainder having been broken off; but it can be directly applied with equal facility to the end walls of the conveyance. For this purpose an opening of suitable size and shape is cut or formed to receive the gate. The gate and opening should be of sufficient size to allow free passage of a hand through it. The gate may be made to turn on vertical or horizontal pivots. In the drawing it is represented as turning on horizontal pivots *a a*. These pivots may either be secured to the gate or to the boxes C, as may be desired. In this case they are represented as being secured to the gate and turning in the bearing-boxes C C, arranged and secured in the door or wall, as shown in Fig. 1, and may be held in place by the back and front plates K K′, which form the framework of the gate and bell and their appendages. Thus mounted, the gate can be turned to either side, either from the outside or inside of the conveyance. As it is desirable to keep the opening closed when not in use, I attach to the pivoted edge of the gate suitable devices to automatically close it when freed from the pressure of the hand.

For this purpose that edge of the gate (the turning edge) is expanded or broadened, as shown in Fig. 2; or wings or projections may be formed on each side, so that a weight or spring, D, may be secured to each side of the gate, by means of which it is automatically closed whenever it has been opened to either side.

In the drawings two springs, D D′, are represented as being the main mediums for automatically closing the gate, they being attached at one end to a stud-pin, *p*, and respectively connected at the other to the projections *m m′*, formed on the pivotal side of the gate, by means of links *d d′* and link-rods or chains *n n′*.

The links *d d′* are pivotally attached to the projections *m m′*—link *d* to projection *m*, and link *d′* to projection *m′*.

A pin, E, is arranged directly at right angles to the axis on which the gate swings, and in a line with the gate when the same is closed, and is provided with a rounded head, *b*, which fits into a recess, *c*, formed in the turning edge of the gate. (See Fig. 1.) The head *b* of pin E is forced by a spring, *h*, into the recess *c*, and into which it fits, and by its pressure steadies the gate and prevents it from rattling when closed.

Pin E is placed in a socket-frame, *o*, secured to or formed on one of the side plates, and is operated on by spring *h*, as shown in Fig. 1.

Figure 3:
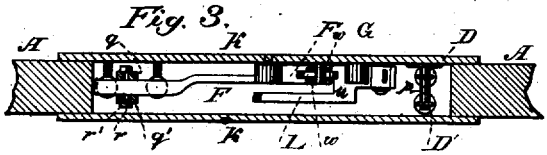

On the opposite end of the pivotal edge of the gate, to which the links *d d′* are attached, are pivotally secured two other links, *i*, in the same manner as the links *d d′*, and which are connected, by means of slotted link-rods *q q′*, to the opposite sides of the lever F by means of a screw-bolt, *r*, and nut *r′*, as shown in Fig. 3—link *q* on one side, and link *q′* on the other.

The bolt *r* of lever F is free to rise or fall in the slots *s*, formed in the lower ends of the link-rods *q q′*.

The nut *r′* on the outside of the link-rods simply confines the latter loosely to the lever F, so that as one rod (say *q*) raises the lever, the other rod, by means of its slot *s*, will slide over bolt *r* and allow the gate to turn.

Lever F is pivoted to side plate K, and carries a cam, G, pivoted to its other end between bifurcations *w*, formed for that purpose, and is operated upon by a spring, *e*, as shown in Fig. 1. The cam G bears upon a cam-shoulder, *u*, formed upon the lever L, which carries the hammer H, as shown in Fig. 3.

The lever L is pivoted at *t* to the plate K, and at that point is provided with a short arm, *u′*, against which a spring, *v*, bears. Spring *v* is also firmly secured to plate K.

To the free end of the lever G, and to which the link-rods *q q′* are connected, is secured one end of a spring or springs, *g*, the other end of each of which is secured to a stud-pin, *g′*, on the side plate K.

The operation is as follows: On opening the gate B to either side, that link-rod, *q* or *q′*, which is raised by the turning of the gate lifts that end of the lever F to which they are connected, and depresses the end on which cam G is pivoted. Cam G in turn acts on the cam-shoulder *u* of the hammer-lever L until it passes shoulder *u*, thereby, in so doing, depressing hammer-lever L, and placing spring *v* in a state of tension. Cam G having passed shoulder *u*, hammer-lever L is then free to receive an impulse by the reaction of spring *v* on its short arm or end *u′*, and is thereby caused to strike an alarm through hammer H on the bell I.

The moment the pressure of the hand is removed from gate B, the spring D or D′—whichever it may be that is then under tension—aided by the reaction of spring or springs *g* on lever F and link-rod *q* or *q′*, as the case may be, causes the gate to close, and in so doing depresses that end of the lever F to which they are connected, and raises its other or cam end, thereby bringing cam G again into position to act upon the hammer-lever.

Cam G, for this purpose, yields to the pressure of cam *u* of the lever L, and in so doing compresses the spring *e* until it has fairly cleared cam-face *u*, on which the reaction of spring *e* forces the cam end of G outward, ready to again act upon the cam-face *u* of lever L, and so on each time the gate is opened, no matter to which side it is turned.

The moment gate B is brought into position to close the opening, the head *b* of spring-bolt E is forced into the depression *c*, formed in the pivotal side of the gate, and thereby aids in steadying and keeping the latter in position to close the opening when not in use.

The mode of applying the gate either to the doors or walls of the conveyance is well illustrated in Figs. 2 and 3, in which the plate K, to which the working mechanism is attached, is applied to one side of the opening formed in the door, and the other or plain plate K′ to the other side of the opening, the plates being made large enough to inclose or overlap that portion of the wall or door which forms the margin of the opening. Screw-bolts are then passed through both plates and the interposed portion of the door or wall, and the whole thereby firmly secured together.

This mode of constructing the gate in two parts renders it very easy to be applied to the conveyance, whether the latter is especially constructed to receive it or not.

It is obvious that the device for connecting the gate with the bell can be varied considerably; also, the device for closing the door. The door may turn on vertical instead of horizontal pivots.

I therefore do not limit myself to the particular device herein shown and described for connecting the bell with the gate, nor the device for automatically closing the gate.

Having described my invention, what I claim as new, and desire to secure by Letters Patent, is—

1. The combination of a small door or wicket-gate, adapted to be opened and closed from either side, with the end platform and wall or door of a street-car or other public conveyance, substantially as and for the purposes set forth.

2. The combination of a bell and a small door or wicket-gate, operated from either side, with the end wall or door of a street-car or other public conveyance, in the manner substantially as and for the purposes set forth.

3. A self-closing wicket-gate, B, in combination with a door or wall of a street-car, omnibus, or other public vehicle, substantially as and for the purpose herein shown and described.

4. The combination of a self-closing wicket-gate and a bell with a door or wall of a street-car or other public conveyance, substantially as and for the purpose set forth.

5. The pin E and spring *h*, in combination with a gate, for the purpose described.

6. A gate-frame consisting of two halves or parts inclosing the bell, and the operating devices of the latter, in combination with a door or wall of a street-car or other public conveyance, for the purposes set forth.

In testimony that I claim the foregoing I have hereunto set my hand this 14th day of April, 1877.

J. B. SLAWSON.

Witnesses:
D. G. STUART,
MAURICE PECHIN.